June 12, 1923.  1,458,347
M. J. LANTIER
LUGGAGE CARRIER FOR AUTOMOBILES
Filed March 3, 1922
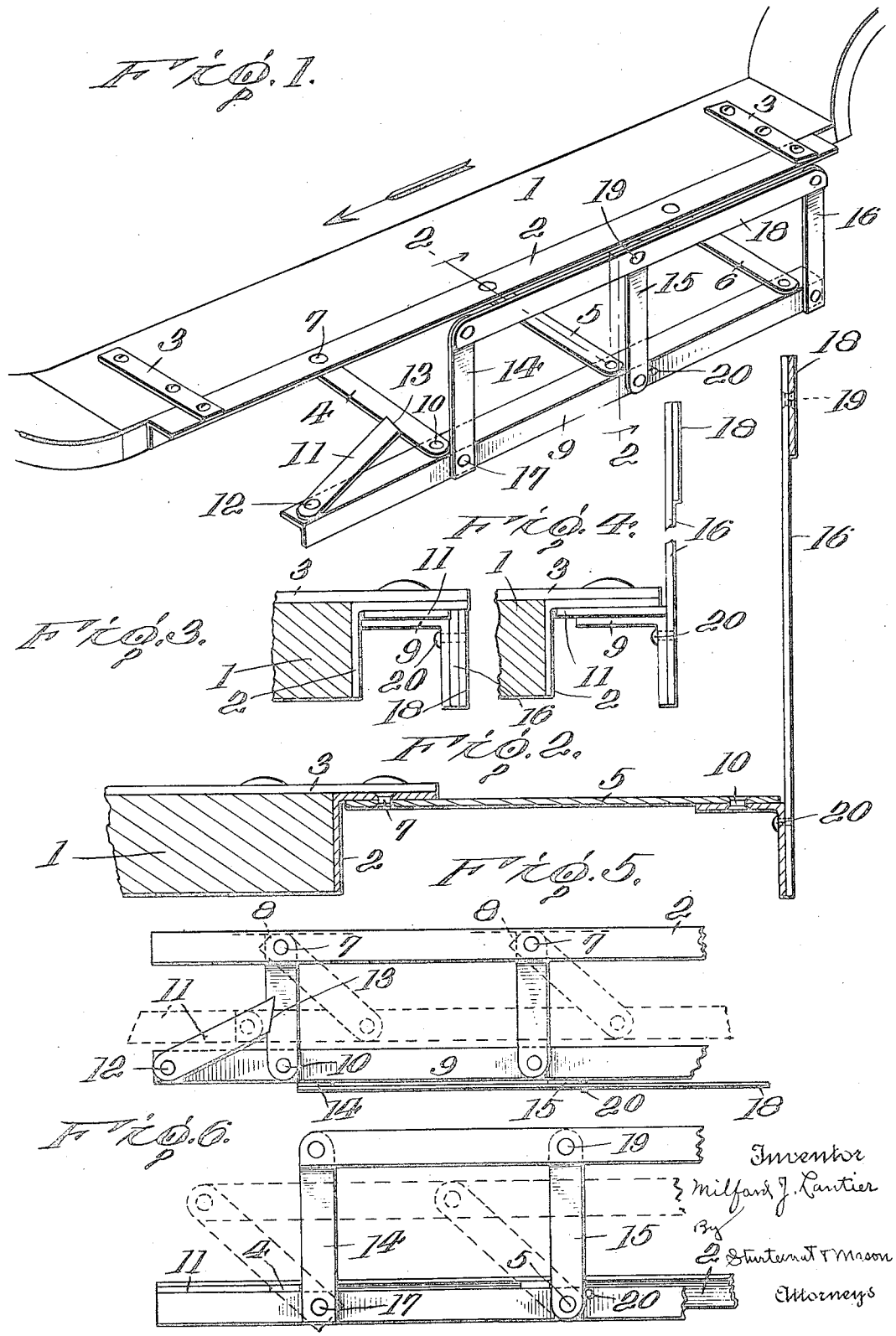
Inventor
Milford J. Lantier
By
Sturtevant & Mason
Attorneys Patented June 12, 1923.

1,458,347

UNITED STATES PATENT OFFICE.

MILFARD J. LANTIER, OF ALEXANDRIA BAY, NEW YORK.

LUGGAGE CARRIER FOR AUTOMOBILES.

Application filed March 3, 1922. Serial No. 540,674.

*To all whom it may concern:*

Be it known that I, MILFARD JOSEPH LANTIER, a citizen of the United States, residing at Alexandria Bay, in the county of Jefferson, State of New York, have invented certain new and useful Improvements in Luggage Carriers for Automobiles, of which the following is a description, reference being had to the accompanying drawing, and to the figures of reference marked thereon.

The invention relates to new and useful improvements in luggage carriers for automobiles or the like, and more particularly to a luggage carrier which is adapted to be attached to the running board of the automobile.

An object of the invention is to provide a luggage carrier which may be extended laterally to widen the space upon which the luggage is to rest and which may also be extended vertically to prevent the luggage from slipping off the running board.

A further object of the invention is to provide a luggage carrier of the above type, wherein the vertically extending portion may be folded into horizontal position and wherein the horizontal portion may be folded so as to be housed close to the edge of the running board.

These and other objects will in part be obvious and will in part be hereinafter more fully disclosed.

In the drawings which show by way of illustration one embodiment of the invention—

Figures 1 is a perspective view showing a portion of an automobile running board having my improvement applied thereto;

Fig. 2 is a sectional view on the line 2—2 of Fig. 1;

Fig. 3 is a transverse sectional view showing the parts completely folded;

Fig. 4 is a similar view but showing the vertical portion as raised without extending the horizontal portion;

Fig. 5 is a top plan view showing the carrier extended and in dotted lines in partly folded condition;

Fig. 6 is a side view showing the vertical portion extended and in dotted lines a partly folded position.

The invention is directed broadly to a luggage carrier which is adapted to be attached to the running board of an automobile and which consists of a horizontal portion and a vertical portion. The vertical portion is so constructed as to fold into a horizontal position and the parts are so arranged that this vertical portion is moved forward or in the direction of travel of the automobile when it is folded, so that the tendency of the forward movement of the automobile is to retain the vertical member in extended position. The horizontal member is also capable of being folded so that the entire luggage carrier may be completely housed along the edge of the running board.

Referring more in detail to the drawings, I have shown the running board of an automobile at 1, and my improved luggage carrier includes an angle iron housing 2 having a horizontal portion and a vertical portion. The angle iron housing is secured to the running board by bracket arms 3—3 which are screwed to the running board and preferably riveted to the angle iron housing. Extending horizontally from the angle iron housing are a series of arms 4, 5 and 6, as herein shown, three in number. Each of these arms is pivoted at 7 to the underside of the horizontal portion of the angle iron housing and the inner ends of these arms, as clearly shown in Fig. 5, are provided with shoulders 8 to limit the swinging of the arms 4, 5 and 6. At the outer ends of the arms 4, 5 and 6 there is an angle iron 9. The arms are each pivoted at 10 to the upper sides of the horizontal section of this angle iron 9, so that the arms may be swung about their pivots 7. The arms 4, 5 and 6 are slightly shorter than the distance between the adjacent pivots 7—7 and therefore the angle iron 9 may be swung underneath the horizontal section of the angle iron housing member 2, as clearly shown in Fig. 3. The shoulders 8 limit the swinging movements of the arms 4, 5 and 6 in one direction and a locking dog 11, pivoted at 12 to the angle iron 9 and engaging a notch 13 in the arm 4, prevents the swinging of the arms in the opposite direction or holds the horizontal section of the luggage carrier extended.

Pivoted to the vertical section of the angle iron 9 are a series of arms 14, 15 and 16, as herein shown, three in number. These arms are each pivoted at 17 to the vertical section of the angle iron 9. Secured to the upper ends of these angle irons is a horizontal bar 18. Said bar is pivoted at 19 to each arm 14, 15 and 16, respectively. A stop pin 20 limits the swinging movement of the arms 14, 15 and 16 when they reach a vertical position. The automobile travels in the direction of the arrow shown in Fig. 1, and, therefore, the tendency of the forward movement of the car is to hold the arm 15 in contact with the stop 20.

It will readily be seen that the vertical portion of the luggage carrier may be swung down so as to bring the bar 18 along side of the vertical portion of the angle iron 9. The arms 14, 15 and 16 are pivoted to the inside portion of the bar 18 and are of such length as to permit the folding of the vertical section. The vertical section may be folded down at any time regardless of the position of the horizontal section and therefore the vertical section may be raised without extending the horizontal section or when the horizontal section is only partly extended, as shown in dotted lines in Fig. 5. Thus the luggage carrier may be adapted to any width of luggage within certain limits. As a matter of fact, the vertical portion may be raised without extending the horizontal section at all, as shown in Fig. 4. When the vertical section is folded and the horizontal section collapsed the whole luggage carrier is housed beneath the horizontal section of the angle iron housing 2, which makes a very compact structure.

It will also be noted that the horizontal section swings in one direction for collapsing, while the vertical section swings in the opposite direction, and this enables the luggage carrier to be collapsed and housed within the angle iron housing which is only slightly longer than the luggage carrier when extended.

When it is desired to use the carrier the angle iron 9 is pulled on and this will extend the horizontal section out from the running board more or less as desired for the width of luggage which is to be carried. The vertical portion is raised and the luggage is placed on the carrier and a leather strap having a snap or the like attached to a screw eye on the running board, or other suitable means, is passed over the top of the luggage and buckled on to the top bar of the luggage carrier.

This luggage carrier instead of being made separate and attached to the running board may be built into the running board, if desired. It will also be obvious that the luggage carrier may be used at other places on moving vehicles than on the running board.

It is obvious that minor changes in the details of construction may be made without departing from the spirit of the invention as set forth in the appended claims.

Having thus described my invention, what I claim as new and desire to secure by Letters Patent, is:

1. A luggage carrier for automobiles or the like comprising a section adapted to be moved horizontally for collapsing said section, and a section carried at the outer edge thereof and adapted to be moved vertically for collapsing said vertical section.

2. A luggage carrier for automobiles or the like comprising a collapsible horizontal section, and a collapsible vertical section attached thereto, said sections being collapsible independently of one another.

3. A luggage carrier for automobile running boards comprising a collapsible horizontal section adapted at its inner edge to be attached to the running board, and a collapsible vertical section carried by the outer edge of the horizontal section, said sections being collapsible independently of one another.

4. A luggage carrier for automobile running boards comprising a horizontal section collapsible in a direction transverse to the running board, and a vertical section carried by the horizontal section and collapsible in a direction perpendicular to the running board.

5. A luggage carrier for automobiles or the like, comprising a housing member adapted to be secured to a running board, arms pivotally secured to said housing member, an outer member pivotally secured to the outer end of said arms, said pivots being so disposed so that said outer member and said arms may fold into said housing, and a collapsible vertical section carried by said outer member.

6. In combination with the running board of an automobile or other vehicle, a luggage carrier comprising a collapsible horizontal section supported by the running board, and a collapsible vertical section carried by said horizontal section, said vertical section being adapted to fold into the plane of the horizontal section, and said horizontal section and folded vertical section being adapted to fold into close relation with said running board.

7. A luggage carrier for automobile running boards, comprising a member adapted to be secured to the running board, horizontal arms pivotally connected to said member, an outer member pivotally secured to the ends of said arms and maintained by them in parallel relation to the edge of the running board, vertical arms pivotally secured to said outer member, and an upper member pivotally secured to said vertical arms and maintained by them in parallel relation to said outer member.

8. A luggage carrier for automobile running boards including a horizontal section comprising a member adapted to be secured to the running board, horizontal arms pivotally connected to said member, and an outer member pivotally secured to said arms and maintained by them in parallel relation to the edge of the running board; and a vertical section comprising vertical arms pivotally secured to said outer member, and an upper member pivotally secured to said vertical arms and maintained by them in parallel relation to said outer member.

9. A luggage carrier for automobile running boards, comprising a member adapted to be secured to the running board, horizontal arms pivotally connected to said member, an outer member pivotally secured to the ends of said arms and maintained by them in parallel relation to the edge of the running board, means for locking the said horizontal arms in a position at substantially right angles to the edge of the running board, vertical arms pivotally secured to said outer member, an upper member pivotally secured to said vertical arms and maintained by them in parallel relation to said outer member, and means for limiting the pivotal movement of the vertical arms when they reach a vertical position.

10. A luggage carrier for automobiles or the like comprising a collapsible horizontal section and a collapsible vertical section carried by the outer edge of the horizontal section, said horizontal section folding in one direction when it is collapsed, and said vertical section folding in the opposite direction when collapsed to facilitate the housing of the collapsed carrier.

11. A luggage carrier for automobiles or the like comprising a housing member, arms pivotally carried by said housing member and adapted to fold beneath the same, a bar secured to the outer ends of said arms, and a collapsible vertical section carried by said bar.

12. A luggage carrier for automobiles or the like comprising an angle iron housing adapted to be secured to the edge of the running board, arms pivoted beneath the horizontal section of said housing, an angle iron pivoted at the outer ends of said arms, said pivots being disposed so that the angle iron may fold beneath the horizontal portion of the housing, and a collapsible vertical portion carried by the angle iron.

13. A luggage carrier for automobiles or the like comprising an angle iron housing adapted to be secured to the edge of the running board, arms pivoted beneath the horizontal section of said housing, an angle iron pivoted at the outer ends of said arms, said pivots being disposed so that the angle iron may fold beneath the horizontal portion of the housing, vertical arms pivoted to said angle iron, and a horizontal bar pivotally connected to the upper ends of said arms, means for limiting the movements of said vertical arms when the same are in raised position, said means being disposed so that the forward movement of the automobile holds the arms in raised position.

14. A luggage carrier for automobiles comprising an angle iron housing adapted to be secured to the edge of the running board with the horizontal section thereof flush with the upper surface of the running board and the vertical section bearing against the edge of the running board, arms pivoted to the horizontal section at the underface thereof, an angle iron pivoted at the outer ends of the arms at the underfaces thereof, stops for limiting the movement of said arms when turned to a position at right angles to the edge of the running board, means for locking said arms in said position, arms pivoted to the angle iron at the outer ends of the horizontal arms and adapted to swing in a vertical plane, a bar pivoted to the upper ends of said vertical arms, and a stop for retaining the vertical arms in vertical position.

15. A luggage carrier for automobiles or the like comprising a collapsible horizontal section secured to the running board or the like, and a collapsible vertical section carried at the outer edge of the horizontal section.

In testimony whereof, I affix my signature.

MILFARD J. LANTIER.